(12) United States Patent
Burrows et al.

(10) Patent No.: US 11,043,014 B2
(45) Date of Patent: *Jun. 22, 2021

(54) PRESENTING INFORMATION ON A MAP

(71) Applicant: GOOGLE LLC, Mountain View, CA (US)

(72) Inventors: Emma Burrows, Zurich (CH); Stefan H. Pharies, Zurich (CH); Jiri Semecky, Adliswil (CH); David P. Marmaros, Mountain View, CA (US); Andrew J. McCarthy, Zurich (CH); Alejandro Diaz, San Francisco, CA (US); Konrad Gianno, London (GB); Marcin Z. Brodziak, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,307

(22) Filed: Oct. 21, 2019

(65) Prior Publication Data

US 2020/0160571 A1 May 21, 2020

Related U.S. Application Data

(63) Continuation of application No. 13/191,377, filed on Jul. 26, 2011, now Pat. No. 10,453,226.

(51) Int. Cl.
*G09G 5/00* (2006.01)
*G06T 11/20* (2006.01)

(52) U.S. Cl.
CPC .................. *G06T 11/206* (2013.01)

(58) Field of Classification Search
None
See application file for complete search history.

(56) References Cited

U.S. PATENT DOCUMENTS

| 6,243,094 | B1 | | 6/2001 | Sklar | |
|---|---|---|---|---|---|
| 6,523,021 | B1 | * | 2/2003 | Monberg | .............. G06F 16/951 |
| 7,624,101 | B2 | | 11/2009 | Lin et al. | |
| 7,822,771 | B1 | | 10/2010 | Chaves et al. | |
| 8,549,028 | B1 | * | 10/2013 | Alon | ..................... G06F 16/245 |
| | | | | | 707/769 |

(Continued)

OTHER PUBLICATIONS

Lee, "U.S. Office Action issued in copending U.S. Appl. No. 13/191,377, filed Jul. 26, 2011", dated Aug. 15, 2013, 25 pages.

(Continued)

*Primary Examiner* — Anh-Tuan V Nguyen
(74) *Attorney, Agent, or Firm* — Dority & Manning, P.A.

(57) ABSTRACT

Methods, systems, and apparatus, including computer programs encoded on a computer storage medium, for presenting information relative to a map. In one aspect, a method includes identifying points of interest within a geographical region; displaying a map for the geographical region; constructing one or more heat areas for the map using the identified points of interest; and displaying one or more polygons on the map, wherein a polygon is displayed to encompass an area within a constructed heat area. In another aspect, a method includes identifying points of interest within a geographical region; displaying a map for the geographical region; displaying one or more polygons on the map, wherein the polygons are displayed to encompass one or more points of interest within the geographical region.

18 Claims, 9 Drawing Sheets

(56) References Cited

U.S. PATENT DOCUMENTS

| | | |
|---|---|---|
| 10,453,226 B1 | 10/2019 | Burrows et al. |
| 2002/0065605 A1 | 5/2002 | Yokota |
| 2004/0249686 A1 | 12/2004 | Murphy |
| 2006/0007022 A1 | 1/2006 | Endo et al. |
| 2006/0069504 A1 | 3/2006 | Bradley et al. |
| 2006/0287810 A1 | 12/2006 | Sadri et al. |
| 2007/0098245 A1 | 5/2007 | Mylaraswamy et al. |
| 2008/0010262 A1 | 1/2008 | Frank |
| 2008/0051989 A1 | 2/2008 | Welsh |
| 2008/0229225 A1 | 9/2008 | Kaye |
| 2008/0238925 A1 | 10/2008 | Meehan et al. |
| 2009/0024315 A1 | 1/2009 | Scheibe |
| 2009/0110302 A1 | 4/2009 | Snow |
| 2009/0132953 A1* | 5/2009 | Reed, Jr. ............. G06F 3/0481 715/781 |
| 2009/0143977 A1* | 6/2009 | Beletski ............. G01C 21/343 701/533 |
| 2009/0249196 A1 | 10/2009 | Yamaji et al. |
| 2009/0276290 A1 | 11/2009 | Sill |
| 2009/0279794 A1* | 11/2009 | Brucher ............. G06F 16/51 382/225 |
| 2010/0094548 A1 | 4/2010 | Tadman et al. |
| 2010/0118025 A1 | 5/2010 | Smith et al. |
| 2010/0161376 A1 | 6/2010 | Spagnolo |
| 2010/0287178 A1 | 11/2010 | Lambert et al. |
| 2010/0305844 A1 | 12/2010 | Choi et al. |
| 2011/0129120 A1 | 6/2011 | Chan |
| 2011/0184949 A1* | 7/2011 | Luo ............. G06F 16/58 707/737 |
| 2011/0193795 A1* | 8/2011 | Seidman ............. G06F 16/29 345/173 |
| 2011/0218934 A1 | 9/2011 | Elser |
| 2012/0084000 A1 | 4/2012 | Wang et al. |
| 2012/0221595 A1 | 8/2012 | Slowe et al. |

OTHER PUBLICATIONS

Lee, "U.S. Office Action issued in copending U.S. Appl. No. 13/191,377, filed Jul. 26, 2011", dated Jan. 27, 2014, 26 pages.
Lee, "U.S. Office Action issued in copending U.S. Appl. No. 13/191,377, filed Jul. 26, 2011", dated Sep. 29, 2014, 37 pages.
Lee, "U.S. Office Action issued in copending U.S. Appl. No. 13/191,377, filed Jul. 26, 2011", dated Mar. 26, 2015, 38 pages.
Lee, "U.S. Office Action issued in copending U.S. Appl. No. 13/191,377, filed Jul. 26, 2011", dated Jul. 16, 2015, 44 pages.
Lee, "U.S. Office Action issued in copending U.S. Appl. No. 13/191,377, filed Jul. 26, 2011", dated Jan. 14, 2016, 52 pages.
Lee, "U.S. Office Action issued in copending U.S. Appl. No. 13/191,377, filed Jul. 26, 2011", dated May 19, 2016, 27 pages.
Lee, "U.S. Office Action issued in copending U.S. Appl. No. 13/191,377, filed Jul. 26, 2011", dated Nov. 3, 2016, 29 pages.
Lee, "U.S. Office Action issued in copending U.S. Appl. No. 13/191,377, filed Jul. 26, 2011", dated Aug. 23, 2017, 32 pages.
Lee, "U.S. Office Action issued in copending U.S. Appl. No. 13/191,377, filed Jul. 26, 2011", dated Jun. 13, 2018, 37 pages.
Nguyen, "U.S. Office Action issued in copending U.S. Appl. No. 13/191,377, filed Jul. 26, 2011", dated Feb. 27, 2019, 22 pages.
U.S. Appl. No. 13/191,377 to Emma Burrows et al. filed on Jul. 26, 2011.

* cited by examiner

TILES USED AT SOME ZOOM LEVEL z, WITH i SET TO 3

FIG. 7

PRESENTING INFORMATION ON A MAP

CROSS-REFERENCE TO RELATED APPLICATIONS

This application is a continuation of and claims priority to U.S. patent application Ser. No. 13/191,377, filed Jul. 26, 2011 and entitled "Presenting Information On A Map." The entire disclosures of the above-identified priority application are hereby fully incorporated herein by reference.

BACKGROUND

This specification relates to presenting information relative to a map. Users can use maps of geographic regions to identify travel routes. Conventionally, a user can make travel plans using hardcopy or web-based maps of a geographic location. In some instances, users can use web sites containing web-based maps to identify an itinerary for travel (e.g., a particular travel route) or hotel locations, where users can typically purchase the itinerary or hotel stay directly through the web site.

SUMMARY

This specification relates to presenting information relative to a map.

In general, one aspect of the subject matter described in this specification can be embodied in methods that include the actions of identifying points of interest within a geographical region; displaying a map for the geographical region; constructing heat areas for the map using the identified points of interest; and displaying one or more polygons on the map, wherein a polygon is displayed to encompass an area within a constructed heat area. Other embodiments of this aspect include corresponding systems, apparatus, and computer program products.

These and other embodiments can optionally include one or more of the following features. A point of interest is determined using geotagged images. A point of interest is determined using business classification data. Geotagged images are used to identify tourist points of interest. Geotagged images are used to identify local points of interest. The polygons encompass areas containing a specified number of hotels and heat areas having a heat value exceeding a specified threshold. The polygons are constructed using a linear regression method. The polygons are constructed using a convex hull method. The polygons are constructed using a connected cell method.

The method can further include receiving a search query wherein the search query includes a reference to a hotel; presenting results responsive to the search query on a map; and presenting one or more polygons encompassing one or more heat areas containing a specified number of hotels. The method can further include receiving user input adjusting the size of a polygon, wherein the adjustment comprises increasing the size of an area encompassed by the polygon; determining hotels located within the increased encompassed area; and presenting to the user hotels located within the encompassed area. The method can further include receiving user input adjusting the size of a polygon, wherein the adjustment comprises reducing the size of an area encompassed by the polygon; determining hotels located beyond the reduced encompassed area; and removing hotels located beyond the encompassed area. The user search query includes transportation preferences and wherein the results include transit information. The responsive results are filtered to the areas encompassed by the polygon.

In general, one aspect of the subject matter described in this specification can be embodied in methods that include the actions of identifying points of interest within a geographical region; displaying a map for the geographical region; displaying one or more polygons on the map, wherein the polygons are displayed to encompass one or more points of interest within the geographical region. The method can further include receiving user input adjusting the size of the one or more polygons to encompass an area. The user is presented with search results identifying hotels located within the encompassed area.

Particular embodiments of the subject matter described in this specification can be implemented so as to realize one or more of the following advantages. Points of interest can be determined for a geographic location using various forms of information, for example, digital photographs, business classification data, location-based services, and user reviews of businesses. In particular, digital photographs can be used to identify areas that are of interest to tourists and also areas that are of interest to locals. The identified points of interest, which include hotel locations, can be shown on a map using various indicators to reflect the popularity (e.g., an area with a high number of touristic activities) of a given area, and the hotels that are most accessible to those areas. In addition, polygon-shaped filters can be drawn to encompass areas based on the popularity of an area. Users can manipulate the drawn polygon-shaped filters to increase or reduce the number of hotel locations displayed on a map, thereby allowing users to identify hotels that are most accessible to the areas that the user is interested in visiting. As a result, users can enhance their travel experience by making travel arrangements (e.g., booking hotel stays) in identified popular areas.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is an example hotel results listing including map with a polygonal-filter.

Like reference numbers and designations in the various drawings indicate like elements.

DETAILED DESCRIPTION

Areas containing points of interest in a geographic region can be identified. Identification of such areas can be accomplished using a variety of points of interest (e.g., places visited by tourists, places visited by locals, restaurant locations, shopping locations, and various locations providing entertainment). Points of interest can be identified in a number of different ways. In particular, images can be used to identify points of interest information (e.g., geotagging information) associated with images or by using the descriptions of images provided by users. Category-based points of interest can be identified using business classification data (e.g., directories classifying businesses in geographic regions based on type). In addition, points of interests can be identified using location-based services or by using reviews of businesses provided by users. In some implementations, hotel locations are used as points of interest.

Areas containing points of interest can be used to display heat areas (e.g., areas containing a high level of tourist or local activities) on a map (e.g., a web-based interactive map). In particular, heat areas can vary in intensity based on the number of points of interest contained within an area and such intensity can be emphasized using visual indicators (e.g., using colors or shading techniques).

In addition, hotel locations can be shown on a map using, for example, graphics or icons. Hotel locations shown on a map can include all hotels contained in a geographic region or hotels that satisfy a user's search criteria. Polygon-shaped filters can be drawn to encompass areas based on hotel locations and heat area intensity (e.g., heat value). For example, a polygon filter may be drawn over an area containing a certain number of hotels. Users can manipulate the drawn polygon-shaped filters (e.g., by dragging the polygon to different regions on the map or by adjusting the polygon vertices) to further restrict or enlarge the polygon-shaped filters which reduces or increases, respectively, the number of hotel locations displayed on a map. In particular, areas containing specific types of points of interest (e.g., touristic points of interest or local points of interest) can be used to generate heat maps corresponding to those areas (e.g., a touristic heat map), where the polygon-shaped filters can be drawn to reflect hotel locations within those specific types of areas. In some implementations, users select one or more types of points of interest (e.g., restaurants, museums, or art galleries) and the polygon-shaped filters are drawn to encompass those points of interest. In some other implementations, user search criteria is refined to search points of interest within areas encompassed by the polygon-shaped filters.

Figure 1:
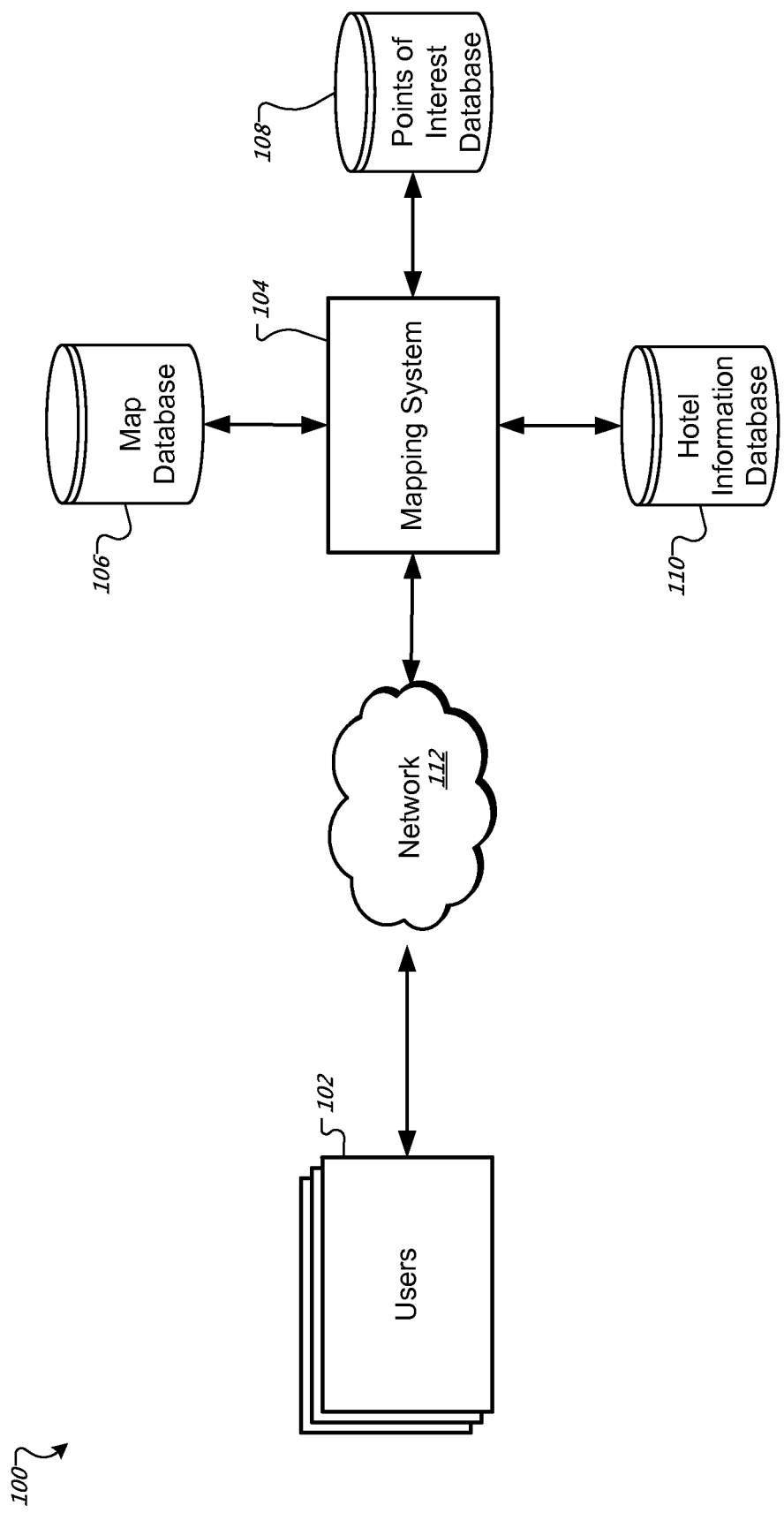
FIG. 1 is a block diagram of an example mapping system.

FIG. 1 is a block diagram of an example hotel search system 100. The hotel search system 100 includes a mapping system 104 in communication with one or more users 102 through a network 112. In particular, the mapping system 104 receives information from a map database 106 in order to display maps for geographic regions. The map database 104 can store, for example, different types of maps for geographic regions (e.g., two-dimensional maps, three-dimensional maps, and satellite maps).

Additionally, the mapping system 104 obtains information pertaining to points of interest from a points of interest database 108. The points of interest database 108 can store, for example, points of interests for geographic regions as identified using various methods (e.g., using geotagged information from images, business classification data, location-based services, and user reviews). Further, the mapping system 104 receives hotel information from a hotel database 110, for example, to determine locations of hotels for identification on a map, e.g., when the hotels are responsive to particular hotel search parameters. The hotel database 110 can store, for example, a listing of hotels for a geographic region, corresponding pricing information, dates of availability, and location. The term "hotel" as used in the specification can refer generically to various types of accommodations including hotels, motels, lodges, or resorts.

The network 112 can be a local area network (LAN), a wide area network (WAN), the Internet, one or more telephony or wireless networks, or a combination thereof.

The mapping system 104 uses the obtained map information and points of interest information to identify areas containing points of interest on a map of a geographic region (e.g., places visited by tourists, places visited by locals, restaurant locations, shopping locations, and various locations providing entertainment). The areas containing points of interest can be identified in advance or in response to a user request for a particular geographic region. In some implementations, the identified areas are used to display heat areas on a map. Heat areas can be visual indicators that can be displayed to reflect a density of elements (e.g., points of interest) contained in a given area. Heat areas can be emphasized using visual indicators (e.g., using colors or shading techniques) based on the number of points of interest contained within that area. In some implementations, areas are divided into spotlighted areas and non-spotlighted areas, where areas are spotlighted based on the density of points of interest contained within those areas. For example, areas containing a large number of points of interest can be signified using the color red while areas that contain fewer points of interest can be signified using the color blue.

The mapping system 104 uses the obtained map information, points of interest information, and hotel information to display hotel locations on a map and to one or more draw polygon-shaped filters to encompass areas based on hotel locations and heat area intensity. In some implementations, the hotels displayed on a map can be determined based on a user's search criteria (e.g., hotel price, location, class, and reviews).

In some other implementations, a polygon-shaped filter is drawn over an area that contains a minimum number of hotels and has a heat intensity (e.g., a heat value) that meets a specified threshold. In yet some other implementations, users can manipulate the drawn polygon-shaped filters (e.g., by dragging the polygon to different regions on the map or by adjusting the polygon) to further restrict or enlarge the areas encompassed by the polygon-shaped filters. As a result, the number of hotels shown within the encompassed area can be adjusted. For example, a user interested in touring a certain area can restrict a polygon-shaped filter to that area in order to identify hotel options available for that area.

Figure 2:
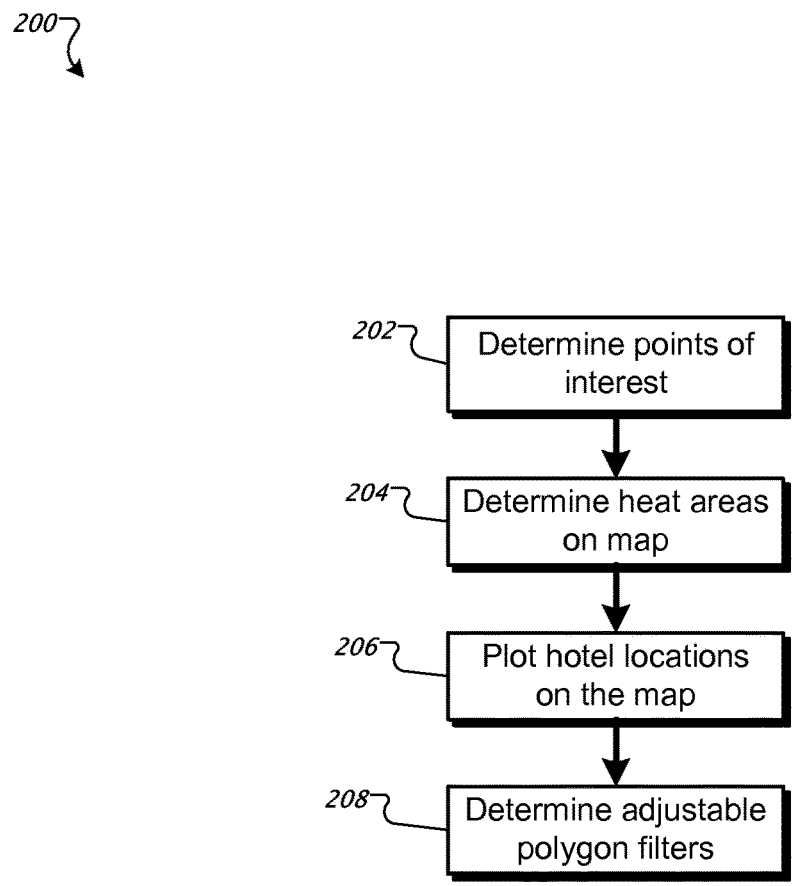
FIG. 2 is a flow diagram of an example process for displaying a heat map with polygon-shaped filters.

FIG. 2 is a flow diagram of an example process for displaying a heat map with polygon-shaped filters. For convenience, the process 200 will be described with respect to a system (e.g., hotel search system 100) including one or more computing devices that performs the process 200. The system determines points of interests to be used for identifying heat areas on a map (202). As indicated above, points of interest can be, for example, places visited by tourists, places visited by locals, restaurant locations, shopping locations, and various locations providing entertainment. In some implementations, points of interest can be identified using information (e.g., geotagging information) associated with images. User images can be obtained from various image repositories, where images have been uploaded by users, and where users have granted access to the uploaded images. In particular, the system can use images taken by a user and determine location and timestamp information associated with that image. For example, images uploaded to an image repository by a particular user can be associated with that user.

In addition, the system can determine a location where a particular image was taken using image data. In some implementations, user comments associated with an image are used to determine a location where a particular image was taken. For example, an image comment "Machu Picchu 2007" indicates that the image was taken in Machu Picchu. In some other implementations, geotagging information embedded in an image is used to determine a location where a particular image was taken. For example, images taken with a mobile phone or similar GPS-enabled device can be automatically tagged with the location of an image. Further, the timestamp of an image can be determined by extracting timestamp information embedded in an image.

The system can use the identified user, location, and timestamp information associated with photographs to determine points of interest on a map. In some implementations, the system uses this information to distinguish between points of interest for tourists and points of interest for local residents. Tourist and local points of interest can be distinguished by defining a region for a location (e.g., a region that encapsulates a given city). Within the defined region, photographs taken by a collection of users are classified as tourist photographs or as local photographs. In particular, a photograph is classified as a tourist photograph if a user took that photograph in the defined region during a specified time interval (e.g., over the course of two weeks), and if the user has not taken any photographs in the defined region outside of the specified time interval. Photographs that do not satisfy this criteria are classified as local photographs.

In some implementations, the classified photographs are accessed through a map interface, where the photographs can be used to indicate tourist and local points of interest. In some other implementations, the tourist and local photographs are used to generate heat maps corresponding to tourist and local areas (e.g., a touristic heat map and/or a local heat map). For example, the heat map can be generated based on a clustering of photographs on a map, where the intensity of heat assigned to a particular area is based on the number of photographs in a cluster. In some alternative implementations, heat maps corresponding to tourist areas and other points of interest are used to generate automated tourist guides for users based on user-specified preferences for activities, transportation, particular dates, and a duration of stay.

In some other implementations, category-specific points of interest are identified using business classification data (e.g., directories classifying businesses in geographic regions based on type). In this regard, the system uses classification data for businesses to identify category-based points of interest. In some implementations, classification data provided by business owners is used to map vendors into a tiered classification system. For example, a restaurant named "Tea and Cake House" can be included in a tiered classification system which maps the restaurant in broad to narrow categories (e.g., "Food and Drink>Drink>Cafes>Tea Cafe>Tea and Cake House"). In this example, the location for the "Tea and Cake House" restaurant can be used to identify category-based points of interest, e.g., points of interest for "Food and Drink," "Drink," "Cafes," "Tea Cafe," or for the actual "Tea and Cake House" restaurant.

In yet some other implementations, points of interests are identified using location-based services, where areas identified to be frequented the most are flagged as points of interest. In some other implementations, points of interest are identified using reviews of businesses provided by users. In particular, the system can identify points of interest based on the number of user reviews for a business and also based on the parsed content of those reviews.

The system determines heat areas on the map (204). In particular, the system uses the points of interest determined in step 202 to construct heat areas on the map. Identification of heat areas is discussed in connection with FIG. 3.

The system plots hotel locations on the map (206). Hotel locations can be determined using various information databases (e.g., hotel information database 110), where a hotel location can include address information or map coordinates. Hotels can be displayed on the map data by plotting indicators corresponding to hotel locations (e.g., using markers to tag hotel locations). In some implementations, the hotels plotted on the map correspond to hotels listed as hotel search results, e.g., in response to user input specifying one or more search parameters.

The system presents adjustable polygon-shaped filters on the map (208). One or more default polygonal-shaped filters can initially be constructed to fit discrete areas on a map based on satisfaction of specified criterion. As discussed in more detail in connection with FIGS. 3A and 3B, these discrete areas on a map at a given zoom level can be referred to as "S2 cells." The size of a polygonal-shaped filter can be determined by the number of S2 cells that it needs to encompass. In some implementations, the polygonal-shaped filter is sized to fit a certain number of hotels (e.g., it should contain 30 percent of the hotels in the city). In some implementations, polygon-shaped filters are assigned to areas based on the number of points of interest contained within that area and on the number of hotels contained within that area. Polygon-shaped filters can be assigned based on heat values for tiles at a certain zoom level and the number of hotels contained within those tiles. In some implementations, polygonal-shaped filters are assigned for particular areas of a map at a specified zoom level having a heat value greater than a specified threshold and a minimum number of hotels. In some other implementations, the threshold is determined based on the city being displayed.

In some other implementations, polygon-shaped filters are drawn by identifying clusters of connected cells. Discrete cells on a map can be sorted in decreasing heat order for one or more points of interest (e.g., touristic points of interest or restaurants), where such cells are added to a list until a specified percentage of a total number of hotels is reached. In some implementations, the total number of hotels is based on a location specified in a user search criteria. Clusters of connected cells can be identified based on the cells that were added to the list and a corresponding polygon-shaped filter can be drawn around each of the identified clusters.

Polygonal-shaped filters can be constructed using different methods. In one implementation, the polygonal-shaped filter is constructed using a regression method. In this regard, a finite regression line is drawn through S2 cells that minimize the total distance to S2 cells. A rectangle is drawn around the finite regression line, where the width is a multiple of the standard deviation to the S2 cells lying horizontally from that line, and where the length is a multiple of the standard deviation to the S2 cells lying along the length of the finite regression line.

In some other implementations, the polygonal-shaped filter is constructed using a convex hull method where a convex hull is drawn around all of the S2 cells, and where the convex hull is approximated using a 4-sided polygon. In yet some other implementations, the polygonal-shaped filter is constructed using a connected cells method. In particular, S2 cells are separated into connected areas where a polygon is constructed around the largest connected area.

In some implementations, the polygonal-shaped filter is a 4-sided polygon. In some other implementations, the polygonal-shaped filter is an n-sided polygon, where n represents a positive integer. The polygonal-shaped filters can be adjusted (e.g., by dragging its borders) by the user to increase or decrease the number of hotels contained within its borders.

In some implementations, polygon-shaped filters are assigned by default in geographic regions based on the density of points of interest (e.g., touristic points of interest). In this regard, a geographic region is divided into S2 cells, as discussed above. The system sorts S2 cells containing at least one hotel based on the density of points of interest (e.g., touristic points of interest) contained within those S2 cells. As discussed above in connection with step 202, points of interest can be determined using geotagged digital photographs. The system identifies S2 cells based on the number of hotels contained within those S2 cells (e.g., cells that contain 75 percent of hotels for the geographic region) and classifies adjacent S2 cells meeting this criteria as "S2 areas."

In particular, a shape is drawn around each S2 area. In some implementations, shapes are drawn around S2 areas using a convex hull algorithm. Further, polygon simplification techniques are used to convert each shape into a polygon. In some implementations, the shapes are converted into 4-sided polygons. The S2 area comprising the most number of S2 cells is assigned a default polygon-shaped filter.

In some implementations, the default polygon-shaped filter is assigned to an area having the most number of hotels. In some other implementations, the default polygon-shaped filter is assigned to an area based on the level of tourist activity in that area. In yet some alternative implementations, users can request placement of additional default polygons-shaped filters on the geographic region, where the system draws a polygon-shaped filter over the area containing the next largest number of S2 cells. As a result, users seeking to visit certain points of interest (e.g., representing touristic activities) can use the locations of the polygon-shaped filters to select hotels that are close in proximity to those points of interest. In some implementations, the default polygon-shaped filter is assigned to an area based on a concentration of points of interest (e.g., restaurants, museums, or art galleries).

Figure 3A:
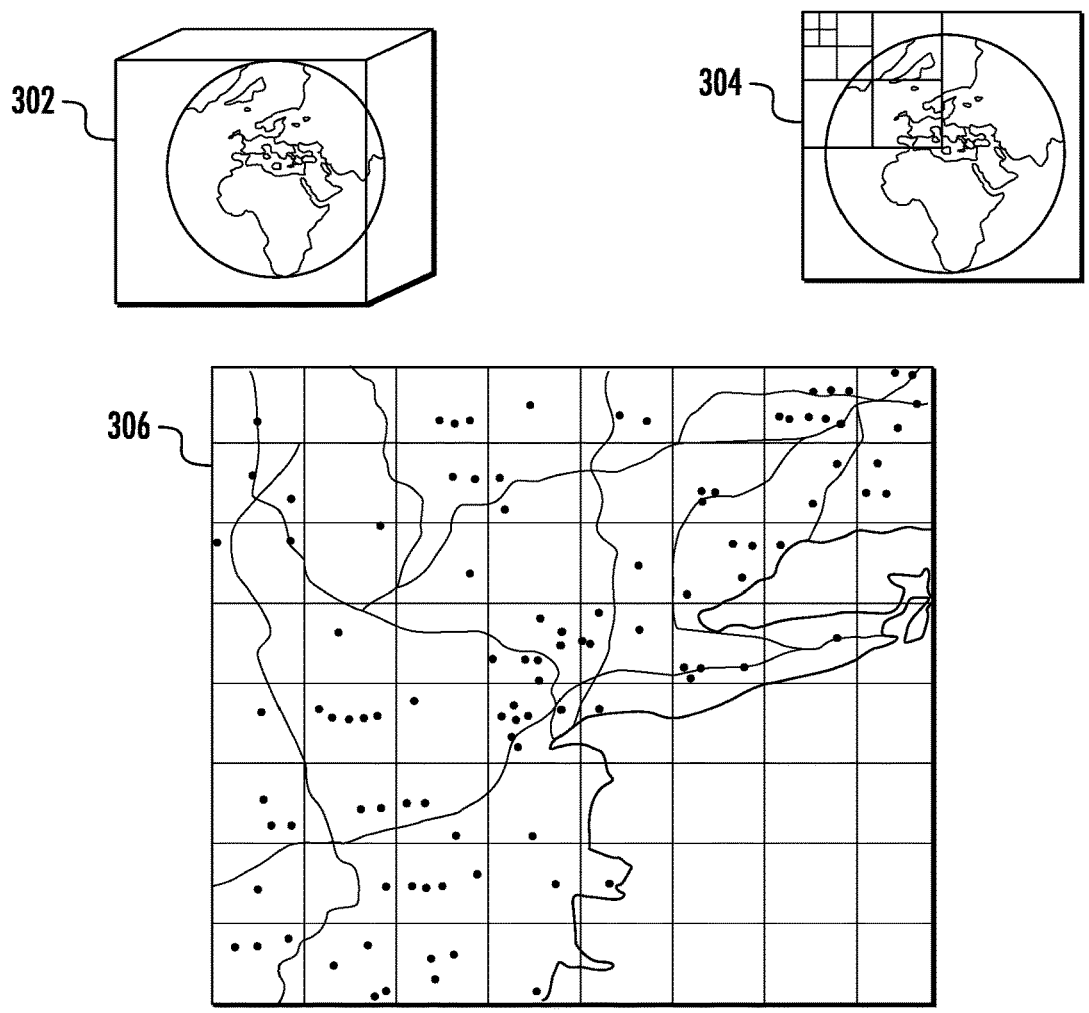
FIG. 3A is an example process for creating heat maps.
Figure 3A:
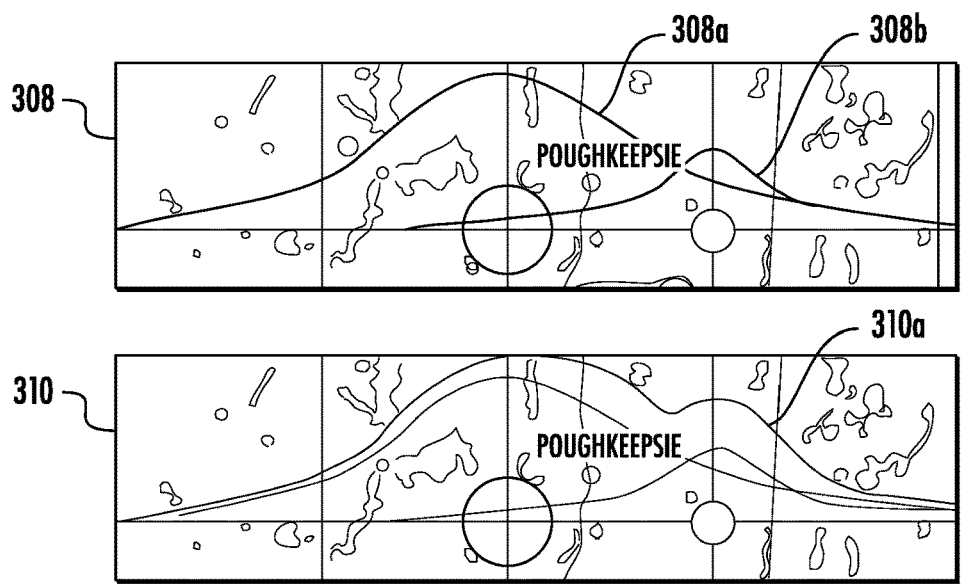
Figure 3B:
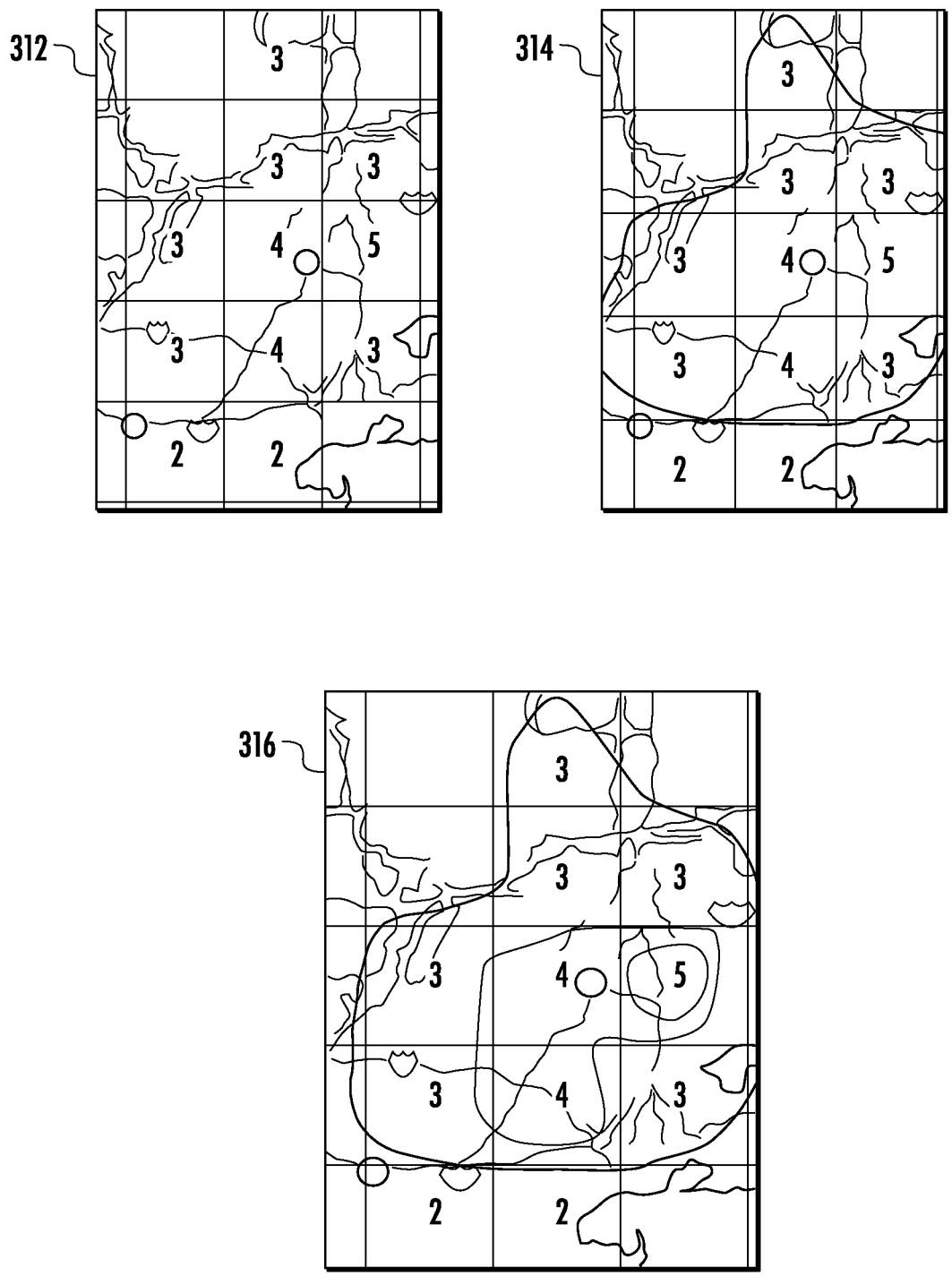
FIG. 3B is an example process for creating heat maps.

FIGS. 3A and 3B show an example sequence for building heat areas on a map. A map of the world is projected in a 3-dimensional view, where each face of the cube is tiled (302). In some implementations, the projected map is of a particular geographic region, where a heat map is built for that particular geographic region.

In some implementations, the map tile for each face of the cube is further divided into sub-tiles (304). For example, each face of the cube can be divided into 4 sections, 31 times, thereby resulting in a number of sub-tiles. Each of the tiles at a given zoom level can be referred to as "S2 cells." Points of interest are marked in each tile corresponding to the location of the point of interest. In particular, the points of interest are marked on the nearest corner of the corresponding tiles at the lowest zoom level, where the nearest corner approximates the location of the point of interest. The same marking is performed for tiles encompassing the sub-tiles, at each subsequent zoom level, until all encompassing tiles, including the parent tile, have been marked. Thus, a corner of each tile in a tile family having a corresponding point of interest is marked.

Heat areas can be determined for tiles in each zoom level using markers for points of interest contained in particular sub-tiles (306). In some implementations, for a given zoom level z, the tiles at zoom level (z+i) are used for determining heat areas, where i is a specified number. In other words, heat can be determined for tiles at a given zoom level using the points of interest markers in tiles at a more focused zoom level. For example, for a zoom level 1, the markers in tiles at zoom level 4 can be used to determine heat areas at zoom level 1. In particular, an increase in i corresponds to an increase in the level of detail provided in a map. Determining heat areas based on zoom level granularity allows manipulation of the amount of heat detail that is rendered at a given zoom level, thereby permitting elimination of unnecessary details and, as a consequence, increasing the speed of the rendering process. In some implementations, i is selected to adjust the level of detail visible to users at a specified zoom level. For example, for i=3, heat areas can be sampled with a lattice distance of 8 pixels in average, for i=2, heat areas can be sampled with a lattice distance of 16 pixels on average, etc.

Using the marked points of interest, a heat value can be assigned to each corner of a tile at a particular zoom level (308). For example, a tile containing several marked points of interest is assigned a higher heat value than a tile containing relatively few marked points of interest. Heat values can be assigned for each tile at each zoom level, starting with the lowest zoom level and progressing to the highest zoom level.

At each zoom level, heat values are smoothed out using a smoothing function so that the heat associated with the tile is evenly distributed, as shown in smoothing curves 308a and 308b. As a result of the smoothing, heat areas can be depicted as showing heat radiating from the marked points of interest. The smoothing curves 308a and 308b can be summed to determine a cumulative heat curve 310a (310). One example smoothing function is:

$$a * e^{-b * r^2}$$

where a is the heat intensity at a given location, where b is the reach of the function,
and where r is the distance of the current point being looked at from the point of heat.

Another example smoothing function is:

$$a * \left(1 - 0.444 * \left(\frac{r}{b}\right)^6 + 1.888 * \left(\frac{r}{b}\right)^4 - 2.444 * \left(\frac{r}{b}\right)^2\right)$$

for r<b and 0 elsewhere, where a is the heat intensity at a given location, where b is the reach of the function, and where r is the distance of the current point being looked at from the point of heat.

A further example smoothing function is:

$$a * \left(1 - \left(\frac{r}{b}\right)^2\right)^2$$

for r<b and 0 elsewhere, where a is the heat intensity at a given location, where b is the reach of the function, and where r is the distance of the current point being looked at from the point of heat.

The system assigns numerical heat values at the pixel level (e.g., the smallest unit at which a heat map is capable of being rendered) to create a visually smooth heat map (312). In particular, the system selects the maximum value of a cumulative heat curve within a given pixel, and assigns that value to that pixel as its heat value. Using this process, heat values are assigned to each pixel in a heat map, as indicated in step 312.

The system assigns smooth contours around pixels having the same heat value (314). As shown in example step 314, the system assigns smooth contours around pixels having a heat value of 3. In contrast, pixels having a lesser heat value (e.g., 2) are not encompassed within the contour.

The system produces heat areas by emphasizing the different contours using, for example, different colors or brightness values (316). Areas having a large number of points of interest can be depicted in a darker color whereas areas having relatively fewer points of interest can be depicted in a lighter color. In some implementations, the heat areas correspond to a specific type of points of interest (e.g., touristic areas), where heat areas having a particular density of the specific points of interest are spotlighted.

Figure 4:
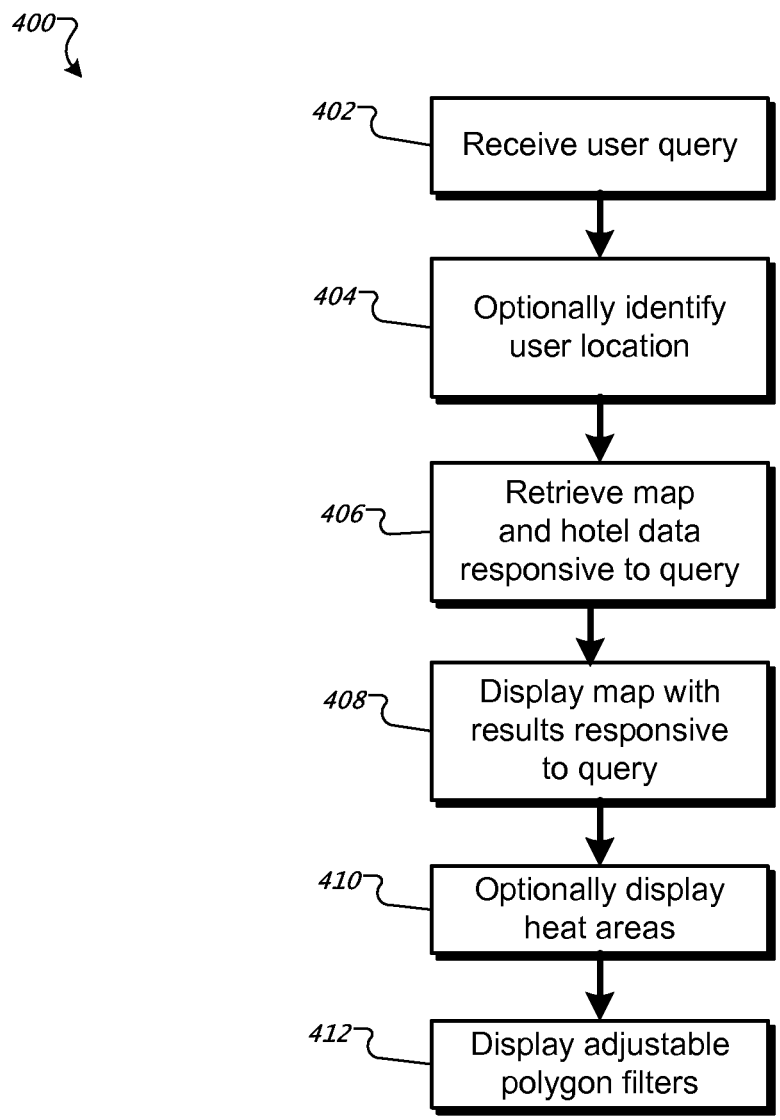
FIG. 4 is a flow diagram of an example process for searching hotels.

FIG. 4 is a flow diagram of an example process 400 for searching hotels. For convenience, the process 400 will be described with respect to a system (e.g., hotel search system 100) including one or more computing devices that performs the process 400.

The system receives a map query triggering a hotel search (402). For example, the user can provide a query to a map search interface that specifies a request for hotels in a particular geographic region (e.g., "hotels in New York" or "hotels 94107"). In some implementations, the query is a refinement of an earlier map query specifying a location. For example, an initial query can be "New York" resulting in the display of mapping information corresponding to "New York" in the map search interface. The user can then modify the query to "New York hotels," or simply "hotels" when the map of New York is already displayed, in order to trigger the hotel search.

The system optionally identifies the user location (404). The user's location can be used, for example, to identify an appropriate point of sale location as well as currency to display in the map search interface for hotel search results. The user's location can be identified based on a user's profile, mobile GPS data, IP address, or other techniques, for example, the domain accessed for the map search.

Even without explicit user location, the domain of the search interface accessed by the user can be used to infer the user location. For example, a user accessing "maps.example.fr" can be considered to be located in France while a user accessing "maps.example.ca" can be considered to be located in Canada.

The system retrieves map and hotel data responsive to the query (406). The map data includes geographic information responsive to the query. For example, the map data can include one or more map tiles that include representations of a geographic region for display in the map search interface. The map data can also include, for example, representations of terrain, satellite images, roads, buildings, and labels (e.g., street names, building names, businesses, or points of interest).

The map data to be displayed can encompass a particular geographic region that depends upon a particular zoom level and a size of a map display region. A user can adjust the zoom level of displayed map data such that additional map data is retrieved corresponding to that zoom level. A default zoom level can initially be presented. The default zoom level can depend on the degree of specificity of location in the query. For example, a query of "New York" can results in an initial zoom level such that a map representation of entire city is displayed. However, if a user enters a specific street address, e.g., "30 Rockefeller, New York City," the default zoom level can be more narrowly focused to that street location.

The hotel data includes hotel search results identified as within the geographic region of the retrieved map data to be displayed in response to the query (e.g., hotels located within a particular city or neighborhood corresponding to the query). For example, the hotel data can include location information, e.g., address information for each hotel, which can be used to identify those hotels within the geographic region. The hotel data can also include other information about each hotel, for example, phone numbers and ratings for the hotel.

The system displays the map and hotel data in a map search results interface (408). The map search results interface can include a first region that displays the map data as well as a second region that displays additional information associated with the map search. In particular, the second region can include a listing of one or more hotels responsive to the query as well as interface elements for obtaining pricing information for particular hotel itineraries. Additionally, the location of one or more of the identified hotels can be plotted on the displayed map data (e.g., using markers to tag hotel locations). In some implementations, the tagged hotels on the map correspond to the listed hotels.

The system optionally displays heat areas corresponding to the map and hotel data in a map search results interface (410). In some implementations, the heat areas are determined in advance using the steps that were discussed in connection with FIGS. 3A and 3B. In particular, the heat areas can be displayed on the map search results interface to distinguish between regions within the map based on the number of points of interests contained within those regions.

The system displays adjustable polygonal-based filters in the map search results interface (412). In some implementations, the polygonal-based filters are constructed by default as discussed in step 208 in connection with FIG. 2. Polygonal-shaped filters determined in advance can be displayed over their respective areas. A user can manipulate the sizes of the polygonal-shaped filters to adjust the number of hotels shown within the filters.

Figure 5:
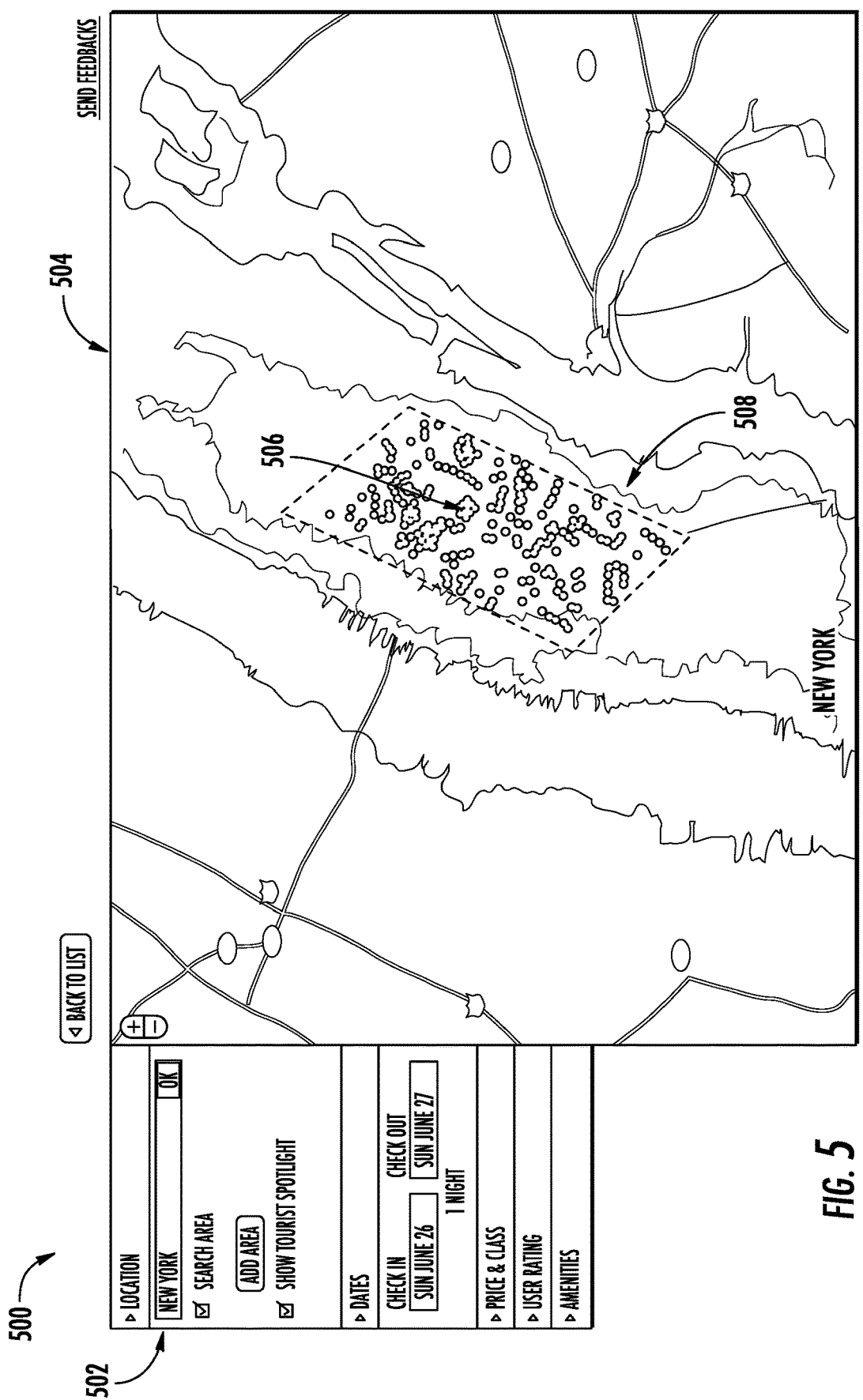
FIG. 5 is an example tourist spotlight map with a polygon-shaped filter.

FIG. 5 is an example tourist spotlight map 500 with a polygon-shaped filter 508. In particular, the tourist spotlight map uses a gradient that darkens less touristic areas on the map based on the density of touristic points of interest within a particular area. The map 500 includes a search filter 502. The search filter 502 can be used to input a search query or to refine an existing query (e.g., based on location, a hotel date range, price, class, reviews, and amenities). For example, a user can enter a query "New York" and then refine the presented results by entering the query "San Francisco."

The map region 504 displays map results responsive to the query. This includes both a geographic representation of the location identified by the query (in this case, New York) as well as additional markers. In particular, the map region 504 includes hotel markers 506 for identifying the location of specific hotels. In some implementations, a marker is directly selectable by a user in order to obtain additional information about the hotel. The map region 504 spotlights areas containing touristic points of interest. In addition, the map region 504 shows an adjustable polygon-shaped filter 508. The polygon-shaped filter 508 encompasses an area identified to contain a certain number of touristic points of interests. Only hotels within the polygon-shaped filter 508 are indicated. In contrast, areas determined to contain an insignificant number of touristic points of interest are shown without spotlighting. In addition, the polygon-shaped filter is adjustable to increase or decrease the number of hotels shown, as depicted in FIG. 6.

Figure 6:
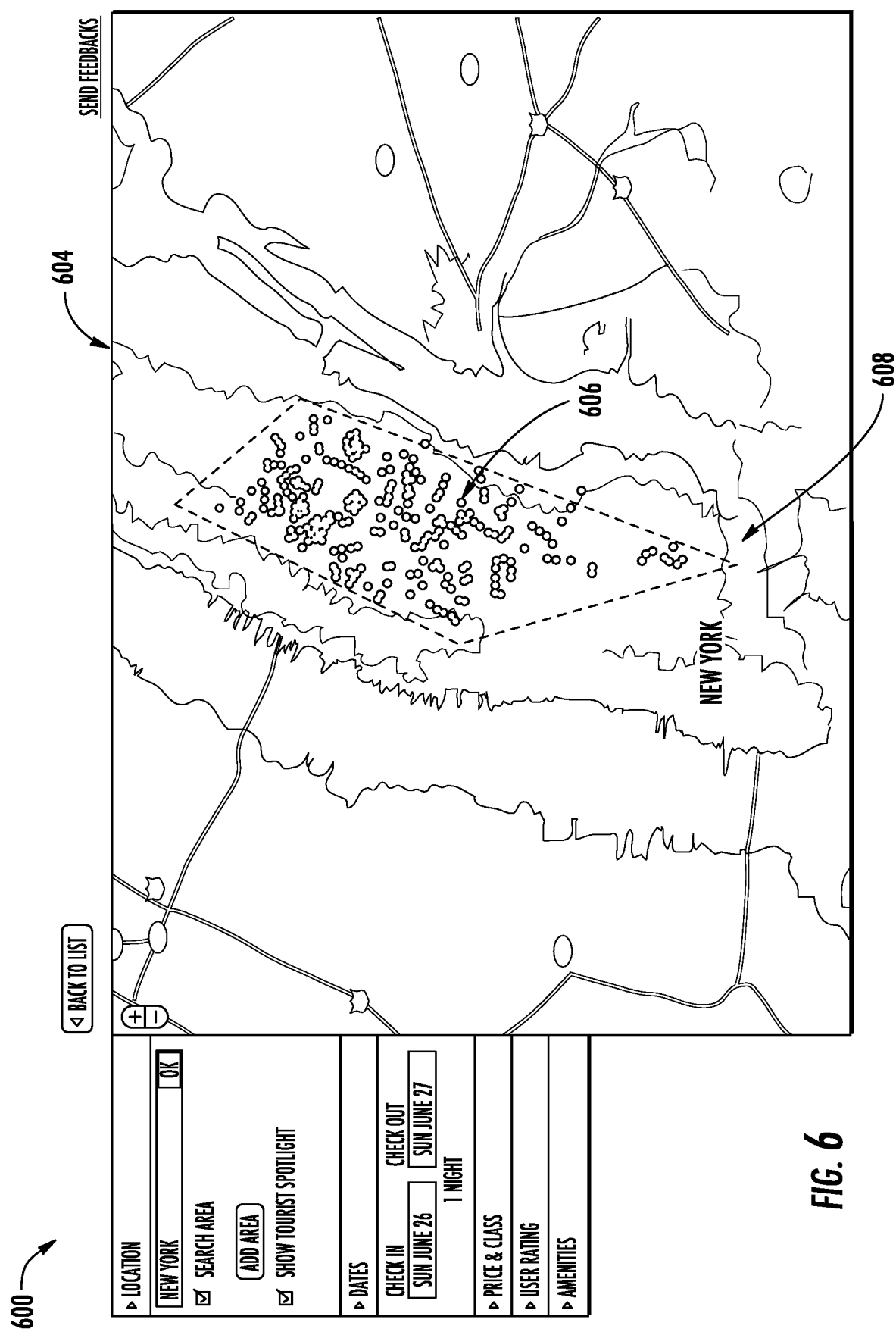
FIG. 6 is an example tourist spotlight map with a polygon-shaped filter being enlarged.

FIG. 6 is an example tourist spotlight map 604 with a polygon-shaped filter 608 being enlarged. In particular, the tourist spotlight map uses a gradient that darkens less touristic areas while lightening the more touristic areas. The map 600 is similar to the one shown in FIG. 5. In particular, the map region 604 depicts an adjusted polygon-shaped filter 608. The polygon-shaped filter is shown as increasing the area of the area originally encompassed by the polygon-shaped filter, e.g., as compared with polygon-shaped filter 508 of FIG. 5. As a result, the number of hotels shown 606 within the polygon-shaped filter has also increased. Similar to FIG. 5, areas containing touristic points of interest are spotlighted whereas areas containing an insignificant number of touristic points of interest are shown without spotlighting.

Figure 7:
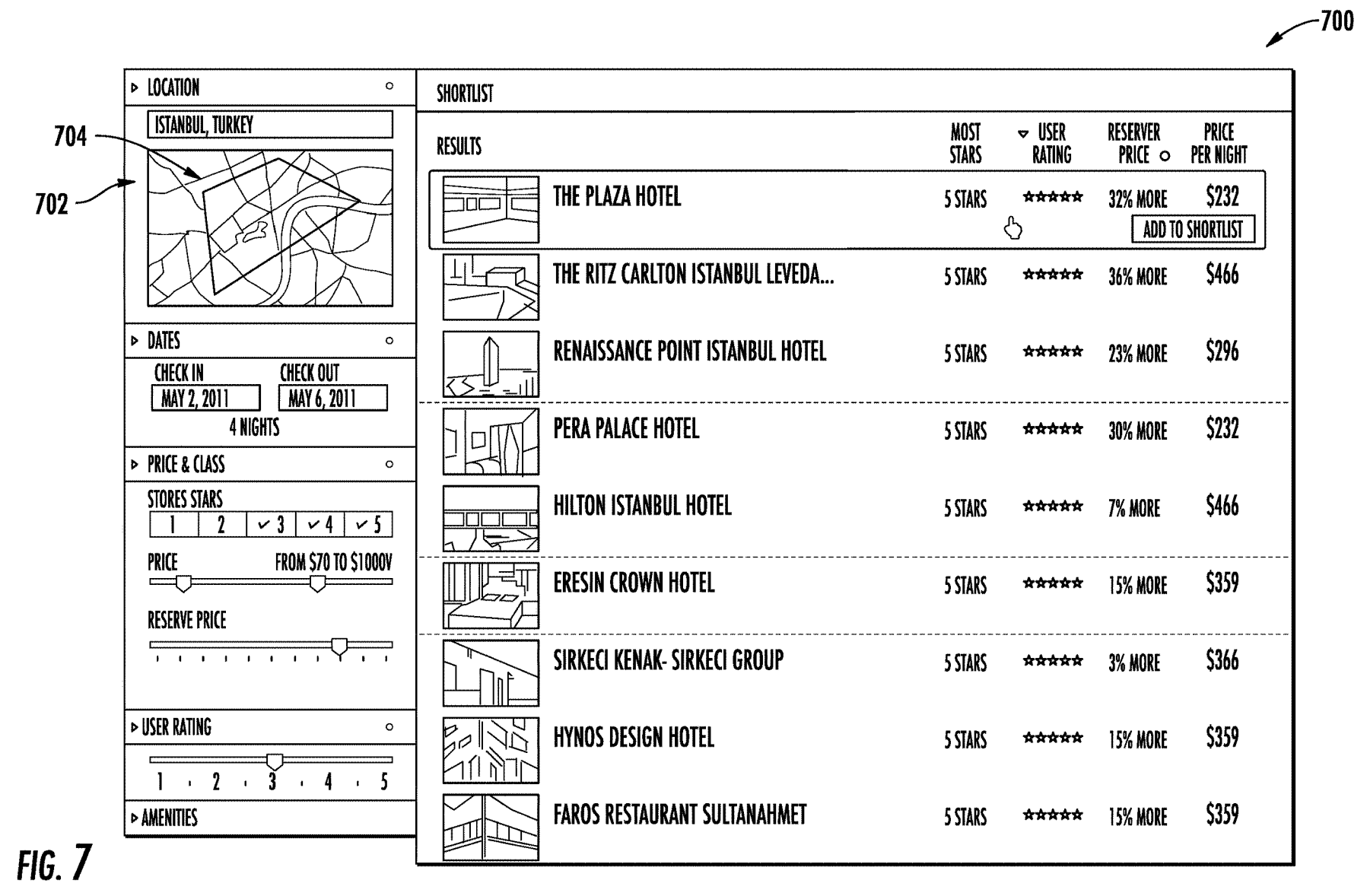

FIG. 7 is an example hotel results listing 700 showing a map 702 with a polygonal-shaped filter 704. The hotel results listing 700 includes a list of hotels including hotel name, snippets of corresponding hotel reviews, class (e.g., star level rating), user rating, relative price, and price per night. The hotel place page 700 depicts a search filter for filtering hotel results based on location, date range, hotel class (e.g., star level), actual price, relative price, user rating, and amenities. In particular, the polygonal-shaped filter 704 is shown as encompassing an area within which hotels from the hotel results listing 700 are located.

Figure 8:
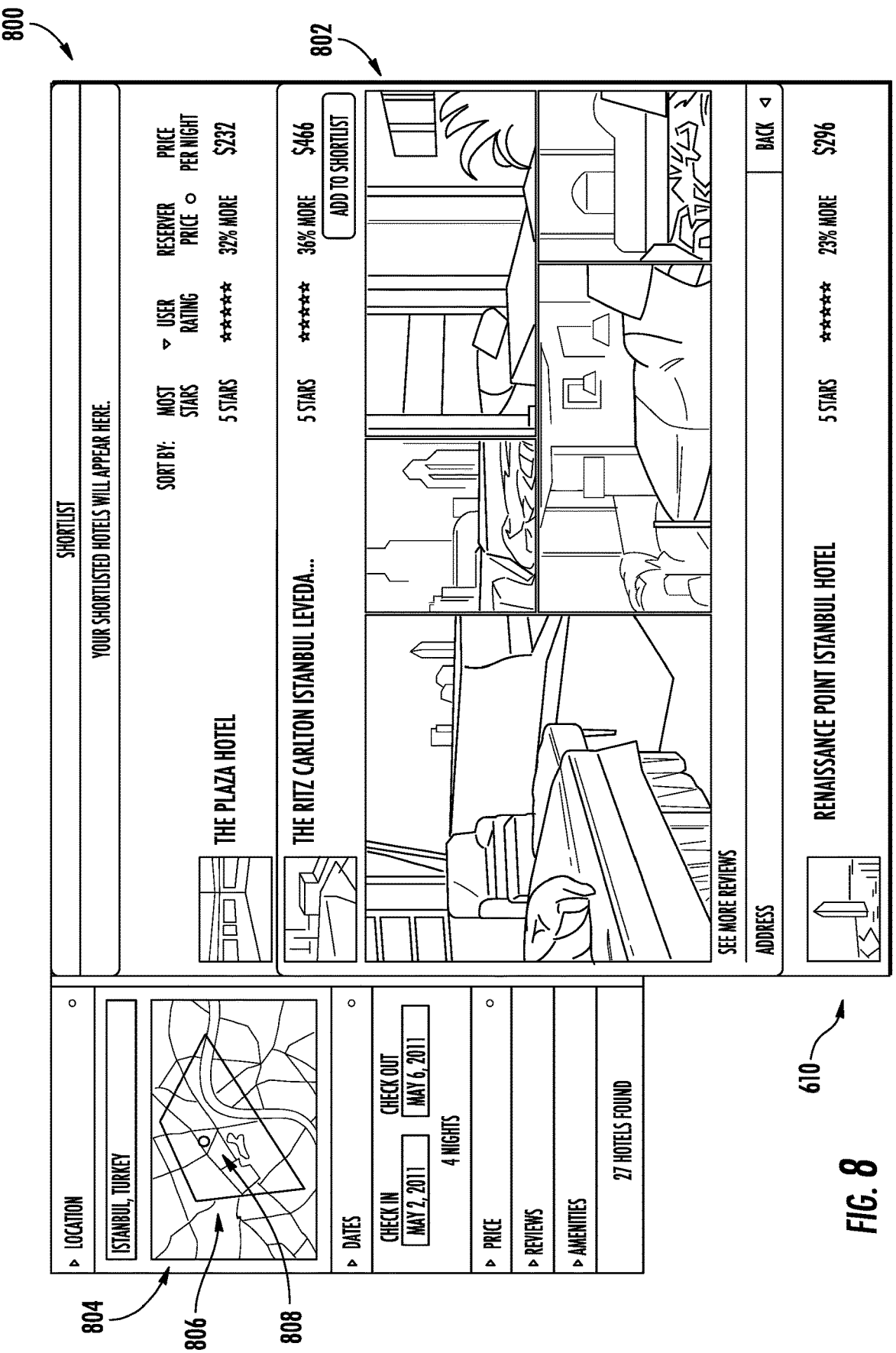
FIG. 8 is an example hotel place page including a map with a polygonal-filter.

FIG. 8 is an example hotel place page 800 including a map with a polygonal-filter. The hotel place page 800 includes a list of hotels and the hotel name, snippets of corresponding hotel reviews, class (e.g., star level), user rating, relative price and price per night, for each hotel. Hotel 802 has been selected and expanded to display additional information including images of the hotel and additional review snippets. The hotel place page 800 also includes a map 804 containing a polygonal-shaped filter 806. The polygonal-shaped filter 806 is shown as encompassing an area within which hotels from the hotel results listing are located. In particular, the polygonal-shaped filter 806 depicts the location 808 of the selected hotel 802.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method to generate map displays comprising heat areas indicating points of interest identified via location associated images, comprising:
   by a mapping computing system:
   identifying point of interest locations based on image data for each of a plurality of images;
   generating a map for a geographical region;
   classifying each of the plurality of images captured in the geographic region during a specified time interval associated with a user as a tourist image;
   classifying one or more of the point of interest locations as tourist point of interest locations based on a number of the tourist images associated with the one or more point of interest locations; and
   constructing one or more heat areas for the map based at least in part on a number of the tourist point of interest locations located in the one or more heat areas; and
   displaying, via a client computing device, the map comprising the one or more heat areas.

2. The method of claim 1, wherein the one or more heat areas comprises a plurality of map tiles, wherein constructing the one or more heat areas comprises assigning a corresponding heat intensity to each map tile of the plurality of map tiles based at least in part on a number of the point of interest locations identified in the map tile.

3. The method of claim 1, wherein constructing the one or more heat areas comprises, by the mapping computing system:
determining, for each of the images, a location on the map;
determining clusters of determined locations on the map; and
generating heat areas encompassing the clusters of determined locations.

4. The method of claim 1, further comprising, by the mapping computing system, for each of the plurality of images, classifying the image as a local image if the image is not classified as a tourist image.

5. The method of claim 1, further comprising, by the mapping computing system:
receiving a search query for hotels in the geographic region;
displaying, on the map, hotel search results responsive to the search query; and
displaying, on the map, one or more bounded areas encompassing one or more heat areas that comprise at least a specified number of hotels.

6. The method of claim 5, further comprising, by the mapping computing system, presenting, on the map, hotels located within each of the one or more bounded areas.

7. The method of claim 6, wherein presenting the hotels located within each of the one or more bounded areas comprises displaying hotel indicators for each of the hotels based on a location associated with the hotel.

8. The method of claim 6, further comprising, by the mapping computing system:
receiving an input, via the client computing device, adjusting a size of a bounded area wherein the adjustment comprises increasing an area encompassed by the bounded area;
determining hotels located within the increased encompassed area; and
presenting, via the client computing device, the hotels located within the increased encompassed area.

9. The method of claim 6, further comprising, by the mapping computing system:
receiving an input; via the client computing device, adjusting a size of a bounded area wherein the adjustment comprises reducing an area encompassed by the bounded area;
determining hotels displayed within the bounded area that are located beyond the reduced encompassed area; and
removing the hotels that are located beyond the reduced encompassed area.

10. The method of claim 6, wherein the one or more bounded areas comprise one or more polygons.

11. The method of claim 1, wherein one or more of the point of interest locations is further identified based on business classification data.

12. The method of claim 11, wherein the business classification data comprises a tiered classification system.

13. The method of claim 1, wherein one or more of the point of interest locations is further identified based on user reviews for the point of interest location.

14. The method of claim 1, wherein one or more of the point of interest locations is further identified based on one or more of a number of the user reviews for the point of interest location and parsed content of the user reviews for the point of interest location.

15. The method of claim 1, wherein one or more of the point of interest locations is further identified based on location-based services, where areas identified to be frequented more than a specified amount are identified as points of interest.

16. The method of claim 1, wherein the image data comprises one or both of user comments indicating an associated location for one or more of the plurality of images or geotagging information embedded in one or more of the plurality of images.

17. A computing system, comprising:
one or more processors; and
one or more non-transitory computer readable media that collectively store instructions that when executed by the one or more processors cause the one or more processors to perform operations, the operations comprising:
by a mapping computing system:
identifying point of interest locations based on image data for each of a plurality, of images;
generating a map for a geographical region;
classifying each of the plurality of images captured in the geographic region during a specified time interval associated with a user as a tourist image;
classifying one or more of the point of interest locations as tourist point of interest locations based on a number of the tourist images associated with the one or more point of interest locations; and
constructing one or more heat areas for the map based at least in part on a number of the tourist point of interest locations located in the one or more heat areas; and
displaying, via a client computing device, the map comprising the one or more heat areas.

18. One or more non-transitory computer readable media that collectively store instructions that when executed by one or more processors cause the one or more processors to perform operations, the operations comprising:
by a mapping computing system:
identifying point of interest locations based on image data for each of a plurality of images;
generating a map for a geographical region;
classifying each of the plurality of images captured in the geographic region during a specified time interval associated with a user as a tourist image;
classifying one or more of the point of interest locations as tourist point of interest locations based on a number of the tourist images associated with the one or more point of interest locations; and
constructing one or more heat areas for the map based at least in part on a number of the tourist point of interest locations located in the one or more heat areas; and
displaying, via a client computing device, the map comprising the one or more heat areas.

* * * * *